United States Patent [19]

Weller

[11] Patent Number: 5,553,767

[45] Date of Patent: Sep. 10, 1996

[54] SOLDERING IRON TIP MADE FROM A COPPER/IRON ALLOY COMPOSITE

[75] Inventor: Carl E. Weller, Nokomis, Fla.

[73] Assignees: Donald Fegley; Emily I. Weller, both of Pottstown, Pa.; a part interest

[21] Appl. No.: 291,944

[22] Filed: Aug. 17, 1994

[51] Int. Cl.⁶ ............................................ B23K 3/02
[52] U.S. Cl. ................................... 228/54; 228/41
[58] Field of Search .............................. 228/51, 54, 55, 228/41; 417/6, 26, 28; 428/548; 75/246

[56] References Cited

U.S. PATENT DOCUMENTS

| | | | |
|---|---|---|---|
| 1,350,181 | 8/1920 | Remane . | |
| 1,985,492 | 12/1934 | Frohmuth et al. | 113/105 |
| 1,992,548 | 2/1935 | Short | 75/1 |
| 1,999,850 | 4/1935 | Smith et al. | 148/11.5 |
| 2,126,559 | 8/1938 | Kirkpatrick | 113/105 |
| 2,273,589 | 2/1942 | Olt | 29/189 |
| 2,356,583 | 8/1944 | Hampton | 204/23 |
| 2,566,752 | 9/1951 | Stern | 148/12.3 |
| 2,665,999 | 1/1954 | Koehring | 117/112 |
| 2,679,223 | 3/1954 | Franklin | 113/105 |
| 2,783,145 | 2/1957 | Boyce | 75/212 |
| 3,080,842 | 3/1963 | Rice | 113/105 |
| 3,109,231 | 11/1963 | Johnson | 29/411 |
| 3,120,436 | 2/1964 | Harrison | 75/200 |
| 3,125,055 | 3/1964 | Lerner | 113/105 |
| 3,157,143 | 11/1964 | Van Embden | 228/54 |
| 3,245,599 | 4/1966 | Johnson | 228/54 |
| 3,315,350 | 4/1967 | Kent | 29/529 |
| 3,459,547 | 8/1969 | Andreotti et al. | 75/208 |
| 3,489,548 | 1/1970 | Adler | 75/0.5 |
| 3,651,306 | 3/1972 | Glyptis | 219/233 |
| 3,652,261 | 4/1972 | Taubenblat | 75/0.5 |
| 4,055,744 | 10/1977 | Fortune | 219/239 |
| 4,187,972 | 2/1980 | Vella | 228/20 |
| 4,424,930 | 1/1984 | Wilhelmson | 228/54 |
| 4,473,181 | 9/1984 | Grabow, Jr. | 228/51 |
| 4,500,027 | 2/1985 | Nakajima | 228/54 |
| 4,997,121 | 3/1991 | Yoshimura | 228/20 |
| 5,004,581 | 4/1991 | Takagi et al. | 420/487 |
| 5,041,176 | 8/1991 | Mikawa | 148/412 |
| 5,215,241 | 6/1993 | Myers | 228/54 |

FOREIGN PATENT DOCUMENTS

| | | | |
|---|---|---|---|
| 718104 | 2/1942 | Germany | 228/54 |
| 425138 | 1/1992 | Japan | 228/54 |
| 1026378 | 8/1985 | U.S.S.R. | 228/54 |

OTHER PUBLICATIONS

P. Villars and L. D. Calvert, *Pearson's Handbook of Crystallographic Data for Intermetallic Phases*. vol. 3, pp. 2239–2240.

Otrud Kubaschewski, *IRON–Binary Phase Diagrams*, pp. 35–37, 139–142 (1982).

W. R. Lewis, Notes on Soldering, pp. 5–6, 19–21, 24, 25, 26, 46, 47 (1963).

*Primary Examiner*—Samuel M. Heinrich
*Attorney, Agent, or Firm*—Popham, Haik, Schnobrich & Kaufman, Ltd.

[57] ABSTRACT

A soldering tip comprising 50–95 weight percent uncoated copper particles and 5–50 weight percent iron particles is prepared by a method in which the particles are compacted, sintered and shaped into a soldering tip. The soldering tips are durable, resistant to pitting by molten solder, and thermally conductive.

9 Claims, 1 Drawing Sheet

SOLDERING IRON TIP MADE FROM A COPPER/IRON ALLOY COMPOSITE

BACKGROUND OF THE INVENTION

1. Field of the Invention

The present invention relates to soldering tips and soldering devices having soldering tips made from copper/iron composites, and methods of making same.

2. Related Art

Copper is a particularly desirable material for forming tips on soldering devices because of its excellent thermal conductivity and good wetting properties. To protect copper soldering tips from oxidation, various methods have been employed. One accepted method is to electroplate the soldering tip with nickel.

A problem with copper soldering tips is that copper is very soluble in tin; thus, some of the copper tip dissolves when contacted with molten solder. This results in deep pitting of the copper tips requiring frequent dressing by filing or grinding. A common technique used to prevent pitting is electroplating iron onto the copper tips.

Another technique which has been suggested to prepare soldering tips is to apply coatings to copper particles and sinter together the coated particles. U.S. Pat. No. 2,679,223 (Franklin) discloses a method for making a soldering tip in which copper particles are agitated and coated with a thin layer of iron, e.g., the copper particles are electroplated in a stirred solution of ferrous chloride. In the next step, the coated particles are compressed and sintered together at 1800° F. to 1900° F. for about three hours, cooled, and then, to form a more suitably dense material, compressed and sintered a second time, and finally compressed a third time. Franklin suggests that the weight of the iron coatings be 10% or less of the weight of the coated particles. It is not believed that this process has ever been used commercially.

U.S. Pat. No. 3,651,306 (Glyptis) suggests the preparation of a porous soldering tip made of copper particles with tin coatings in which the tin functions as a binder during sintering of the particles. The voids in the porous tip are filled by vacuum impregnation with a solder material. During operation capillary action keeps the molten solder material within the tip of the soldering device.

The various soldering tips and methods for making soldering tips described above have a variety of disadvantages. Coatings on soldering tips such as nickel or iron coatings have a significantly lower thermal conductivity than copper and therefore these coatings must be thinly applied. As a result, the coatings may crack or be scratched and the underlying copper is then subject to relatively rapid erosion. Techniques that require coating of copper particles prior to forming a tip have undesirable processing requirements such as electroplating or other coating processes and the need for multiple sintering steps.

Thus there remains a need for durable, high thermally conductive soldering iron tips and methods for making soldering iron tips by simple and inexpensive processes. There is also a need for novel alloy composites that have properties of thermal conductance and resistance to erosion by the tin content of the solder, which makes them suitable for use in soldering tips.

OBJECTS OF THE INVENTION

Therefore it is an object of the invention to provide a soldering tip that exhibits good thermal conductivity, good resistance against pitting, affinity for molten solder and can be manufactured at low cost.

It is another object of the present invention to provide a method for making soldering tips which does not require electroplating of iron.

It is a further object of the present invention to provide a copper and iron alloy composite that exhibits good thermal conductance and good resistance against attack from molten tin.

SUMMARY OF THE INVENTION

These and other objects of the invention are achieved by a soldering tip comprising a composite comprised of a sintered mixture of 50–95 weight percent uncoated copper particles and 5–50 weight percent iron particles.

The soldering tip of the present invention is made by a process comprising the steps of: blending 50–95 weight percent uncoated copper particles with 5–50 weight percent iron particles; compacting the resulting mixture of particles; sintering the mixture of particles; and shaping the mixture of particles into the shape of a soldering tip. This process utilizes methods and conditions conventionally used in the powder metallurgy art. The soldering tip can be shaped by compaction in a mold and/or machining. The soldering tip can also be made by a process in which a machined copper or copper alloy upper portion is bonded to a lower portion comprising 50–95 weight percent uncoated copper particles and 5–50 weight percent iron particles. The lower portion can be compacted and machined to a desired shape prior to, or more preferably after, bonding to the upper portion. It is preferred the soldering tip be additionally protected by coating a layer of nickel on the exterior of the soldering tip.

The soldering tip of the present invention comprises a sintered mixture of 50–95 weight percent uncoated copper particles and 5–50 weight percent iron particles. The sintered soldering tip comprises discrete iron particles dispersed throughout the copper particles (although it is believed that small amounts of iron, up to 5%, are alloyed with the copper in the interfacial region between particles). During use in soldering, it is believed that the iron reacts with the molten tin to form an $FeSn_2$ intermetallic compound that helps to protect the soldering tip from erosion.

Soldering tips of the present invention with a relatively high iron content are most useful in repair work for making relatively few soldered connections, about 1 to 10 per minute. In applications for making connections at a relatively low rate, the high iron content soldering tip provides long service life with adequate heat delivery. Soldering tips of the present invention with a relatively low iron content are preferred for production-use of about 10 connections or more per minute. These production-use applications require high thermal conductivity and therefore shorter service life is acceptable.

In one embodiment of the present invention, a rod is made by extrusion of a mixture comprising about 90 weight percent uncoated copper particles with about 10 weight percent iron particles. The rod is then machined into the shape of a soldering tip which comprises about 10 weight percent iron particles throughout the entire length of the soldering tip. In a more preferred embodiment, the soldering tip is plated with a nickel layer to enhance oxidation resistance.

In another embodiment, a relatively high percentage of iron particles are used to prepare the composite of the present invention. A soldering tip 10 (see FIG. 1) can be prepared utilizing a relatively high iron content composite by using the relatively high iron content composite for the lower portion 12 of the soldering tip, and using a relatively pure copper or copper alloy rod for the upper portion 14 of the soldering tip. In this fashion, the bottom portion of the soldering tip has enhanced resistance against pitting caused by molten tin, while the overall thermal conductance of the soldering tip is maintained at a suitably high level. In another embodiment, the composite forming the lower portion of the soldering tip is comprised of about 10–50 weight percent iron particles and more preferably about 20 weight percent iron particles and about 80 weight percent uncoated copper particles. In preferred embodiments, the soldering tip thus formed is protected from oxidation by a layer of nickel plating applied to the exterior of the soldering tip.

DETAILED DESCRIPTION OF THE INVENTION

The composition of the present invention comprises 50–95 weight percent uncoated copper particles and 5–50 weight percent iron particles. In this context, uncoated particles are particles of a metal or metal alloy that are not coated with a secondary metal on the exterior of the particle. For example, uncoated copper particles have not been electroplated or otherwise coated with iron or any other metal. The particles may be of a variety of sizes and shapes. The composite should be prepared from fine particles. In a preferred embodiment, the copper and iron particles are about 325 mesh size.

Within the above-described limits, the composite of the present invention may contain various additives. For example, in certain embodiments, binders and/or lubricants may be added to the composition to facilitate extrusion or compaction. In another embodiment, additional elements, such as lead, may be added to improve the machinability (e.g. to provide free machining) of the composite.

The particles can be blended by any known method for blending metal particles including shaking and stirring. For uniform results, it is desirable that the particles be blended to achieve a homogeneous mixture of particles.

In order to densify the mixture of particles and to facilitate inter-particle adhesion, the particles are compacted. The particles may be compacted by any method known in the art including pressing, extrusion and rolling. While the amount of pressure needed to be applied during compaction has not been thoroughly studied, it is noted that a compaction pressure of 60,000 pounds per square inch (psi) produces satisfactory results.

Figure 1:
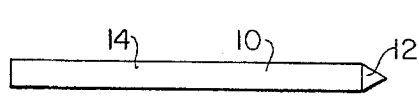
FIG. 1 illustrates a typical soldering tip.

In a preferred embodiment a powder mixture containing a relatively low amount of iron particles, such as 10% iron particles, is compacted, heated and extruded to form a free machining rod. Preferably the powder mixture comprises about 90 weight percent uncoated copper particles and about 10 weight percent iron particles. The compositional limitations of the latter aspect have not yet been worked out precisely; however, this preferred composition is believed to be within two or three weight percent of the above described percentages (i.e., "about" means plus or minus 3%). As noted above, a small amount of lead or other suitable elements may be added to aid machinability. The rod is then machined into the shape of a soldering tip, such as the tip 10 illustrated in FIG. 1. Preferably, the tip is then nickel plated. As compared to a soldering tip made from copper only, pitting from tin contact in soldering will be greatly reduced. Furthermore, the soldering tip will be of a sufficient length to permit multiple re-facing operations.

It has also been found that adding as little as 5 weight percent iron particles to 95 weight percent copper particles, followed by heat treatment, yields a material that has greater strength after exposure to high temperatures. This improves the machinability, and also the greater rigidity is helpful when using long and slender tips.

Figure 2A:
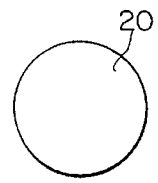
FIG. 2A illustrates a top view of a compact form that can be welded or silver soldered to a copper rod.
Figure 2B:
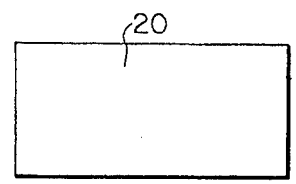
FIG. 2B illustrates a longitudinal side view of a compact form that can be welded or silver soldered to a copper rod.

In one embodiment, a compact 20 (see FIG. 2) is made by compacting a mixture of copper and iron particles. The compact thus formed can then be attached to a copper rod by a variety of methods including: silver soldering, butt welding, and flash welding. The resulting article can then be machined to a desired shape for use as a soldering tip.

In another embodiment, the mixture of particles is adhered to a copper rod during the compaction step. This may be accomplished by using a machined copper rod 32 (see FIG. 3) as one of two punches that form a compact 34 in a die. Subsequent sintering of the copper rod with the attached compact causes diffusion and creates a metallurgical bond between the copper/iron compact composite and the copper rod.

In a preferred method the soldering tips are made by an automated process in which a metered charge of powdered metal is introduced into tooling specifically designed for soldering tips and compacted by a hydraulic press. In one embodiment, a machined copper rod 32 is used as one of the punches in the hydraulic press. In another embodiment, a lower portion 36 is made by pressing and shaping. The lower portion is then bonded to the upper portion 32. In a preferred embodiment, the copper/iron mixture of particles is extruded into a free machining rod and machined into a form that can be press fitted to a copper rod and welded, silver soldered or bonded by sintering to form a soldering tip.

In the above-described embodiments, the soldering tip thus formed has an upper portion formed of copper and a lower portion formed of a copper/iron composite. (In a preferred embodiment the lower portion is about 15% of the overall tip length.) Thus the overall thermal conductance of the soldering tip is maintained at a high level while the lower portion of the soldering tip, which will contact the molten solder, has enhanced resistance to damage from pitting. In one embodiment, the lower portion comprises 10–50 weight percent iron particles and about 50–90 weight percent copper particles. Preferably, the lower portion comprises about 20 weight percent iron particles and about 80 weight percent copper particles.

The mixture of particles should be sintered after compaction. A second compaction after sintering can be performed to increase density. The sintering step increases both the strength and thermal conductivity of the copper-iron mixture. The copper particles should not be melted during processing. It is preferred that sintering be conducted between 1800° F. and the melting point of the copper particles. It is also preferred that sintering be conducted in a protective or reducing atmosphere, such as hydrogen. Sintering at 1850° F. for 1 to 2 hours has been used with good results. In a preferred procedure, sintering is conducted at about 1850° F. for 2 hours and the resulting sintered composite compacted a second time (for example, by forging) to achieve a denser composite.

The mixture of particles can be shaped into a soldering tip by processes known in the powder metallurgical arts. These processes include pressing in a die, forging, and machining to shape. As can be appreciated, the methods of the present invention have broad applicability and are not limited to a particular shape or size of soldering tip. In a preferred embodiment, the soldering tip of the present invention is prepared by affixing the composite to a copper rod as described above, and forming a pointed tip by cold forging or more preferably by milling or sawing.

The structure of the copper-iron composite is an important feature of the present invention. As explained above, the copper is not melted during sintering and therefore it is believed that discrete particles of copper and iron remain in the sintered material. The absence of a coating on the copper particles in the powder mixture of the present invention results in a difference, after processing, in the structure of the composite of the present invention as compared with sintered articles prepared using coated copper particles.

As described herein, the composites and methods of the present invention are especially well-suited for making soldering tips, but the alloys and methods may also be useful in other applications requiring materials having durability and good thermal conductance, especially in situations where corrosion resistance is also desired.

EXAMPLES

Samples were prepared and tested for mixtures consisting of various amounts of copper and iron powders. The starting materials were 325 mesh iron powder and 325 mesh copper powder.

The metal powders were mixed together and compacted in a die with punches applying compacting pressure on each end of the compact. This method of compaction forms a uniform and dense part. A hydraulic press is preferred for better pressure control. A pressure of about 60,000 psi was found to produce good results.

Figure 3:
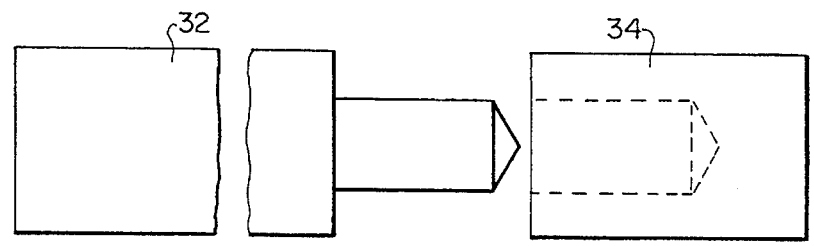
FIG. 3 is an exploded view of a blunt soldering tip, prior to shaping, comprising a machined copper rod upper portion of a soldering tip and a blunt compact lower portion of a soldering tip.

One of the punches, in this case the top punch, was a machined copper rod 32 (see FIG. 3). After compaction, the copper rod with the attached copper/iron compact composite was pushed out of the die and then heat treated at 1850° F. in a hydrogen atmosphere for 2 hours.

Figure 4:
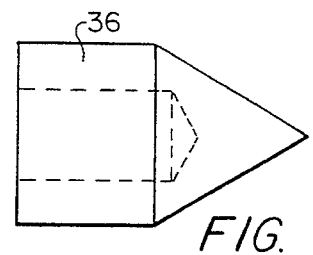
FIG. 4 illustrates a shaped lower portion of a soldering tip.
Figure 5:
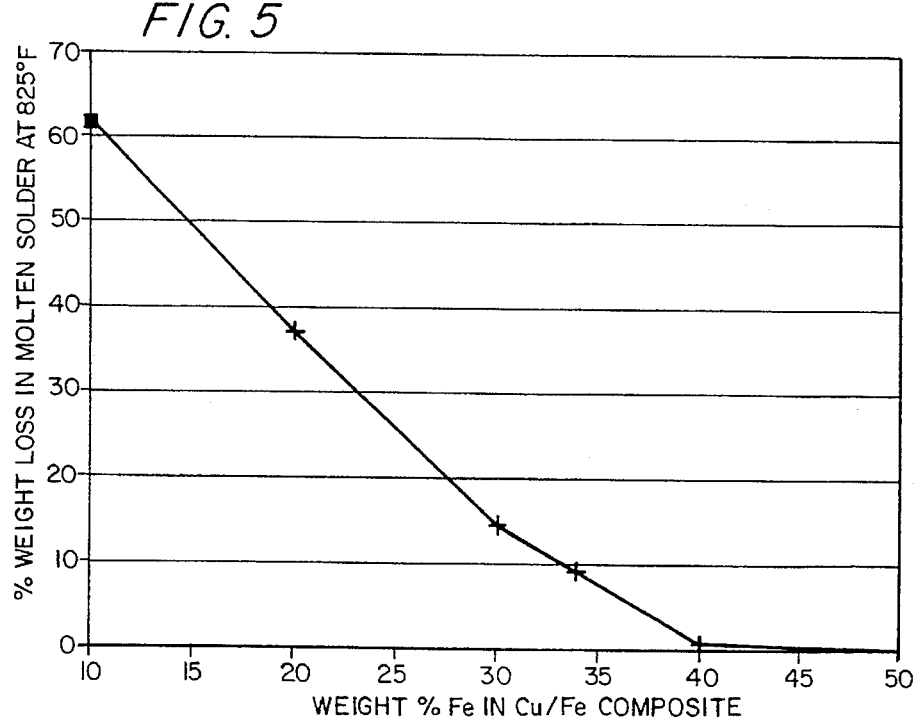
FIG. 5 illustrates the dissolution, in weight %, of sintered powder metal compacts immersed for 48 hours in a 50—50 solder S at 825° F. versus weight % of iron in the copper/iron compacts.

Compacts made by the above-described process were tested by immersing them for 48 hours in 50—50 solder S at 825° F. and measuring the percent weight loss versus the weight percentage of iron powder in the copper/iron compact. Results of this testing are graphically depicted in FIG. 4 and are tabulated below.

| Weight % Fe | % Weight Loss |
|---|---|
| 10 | 62 |
| 20 | 37 |
| 30 | 14.5 |
| 34 | 9.0 |
| 40 | 0.5 |
| 50 | 0 |

A specimen made of pure copper tested under the same conditions showed a 45% weight loss in only 3 hours.

A composite containing 50 weight % iron particles showed no erosion damage under the testing conditions. Thus there is no incentive to use more than 50 weight % iron particles. From the testing results it appears that a mixture of about 80 weight % copper particles and about 20 weight % iron particles exhibits a good combination of good thermal conductance and extended service life.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A soldering tip comprising a composite comprising a sintered mixture of 50–95 weight percent uncoated copper particles and 5–50 weight percent iron particles.

2. The soldering tip of claim 1 wherein said copper particles and said iron particles are −325 mesh size.

3. The soldering tip of claim 1 comprising about 90 weight percent uncoated copper particles and about 10 weight percent iron particles throughout the entire length of said soldering tip.

4. A soldering tip having a top portion and a bottom portion comprising a composite comprising a sintered mixture of 50–95 weight percent uncoated copper particles and 5–50 weight percent iron particles and wherein said top portion consists essentially of copper and wherein said bottom portion comprises 10–50 weight percent iron particles and 50–90 weight percent copper particles.

5. The soldering tip of claim 4 further comprising a layer of nickel on the exterior of said soldering tip.

6. The soldering tip of claim 4 wherein said bottom portion comprises about 20 weight percent iron particles and about 80 weight percent uncoated copper particles.

7. The soldering tip of claim 4 wherein said bottom portion consists essentially of 67–90 weight percent uncoated copper particles, 10–33 weight percent iron particles.

8. The soldering tip of claim 7, wherein said bottom portion consists of about 80 weight percent uncoated copper particles and about 20 weight percent iron particles.

9. A soldering tip comprising a composite comprising a sintered mixture of 50–95 weight percent uncoated copper particles and 5–50 weight percent iron particles and wherein said composite additionally comprises an amount of lead that is sufficient to increase the machinability of said soldering tip but does not substantially reduce the thermal conductivity of the soldering tip.

* * * * *